United States Patent
Pfander et al.

(10) Patent No.: US 7,317,959 B2
(45) Date of Patent: Jan. 8, 2008

(54) SYSTEM AND METHOD FOR MODELING AND/OR EXECUTING SOFTWARE APPLICATIONS, ESPECIALLY MES APPLICATIONS

(75) Inventors: Gotthard Pfander, Erlangen (DE); Elmar Thurner, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/498,081

(22) PCT Filed: Nov. 28, 2002

(86) PCT No.: PCT/DE02/04378

§ 371 (c)(1),
(2), (4) Date: Jun. 8, 2004

(87) PCT Pub. No.: WO03/050677

PCT Pub. Date: Jun. 19, 2003

(65) Prior Publication Data

US 2005/0039161 A1 Feb. 17, 2005

(30) Foreign Application Priority Data

Dec. 12, 2001 (DE) .................. 101 61 114

(51) Int. Cl.
| | |
|---|---|
| G06F 19/00 | (2006.01) |
| G06F 9/46 | (2006.01) |
| G06F 7/00 | (2006.01) |
| G06F 17/00 | (2006.01) |
| G06F 9/44 | (2006.01) |
| G06F 3/00 | (2006.01) |
| G06F 13/00 | (2006.01) |
| G05B 15/00 | (2006.01) |
| G05B 19/42 | (2006.01) |
| G05B 19/418 | (2006.01) |

(52) U.S. Cl. .................. 700/97; 700/83; 700/87; 700/96; 705/8; 707/102; 717/103; 717/105; 717/109; 719/328; 719/331

(58) Field of Classification Search ........ 717/101–105, 717/109, 113, 120, 121, 162–165, 106, 107, 717/108, 124, 127, 174; 700/86–88, 95–96, 700/83; 719/328–332; 705/8; 709/201, 709/202; 707/100, 102
See application file for complete search history.

(56) References Cited

U.S. PATENT DOCUMENTS 5,631,825 A   5/1997   van Weele et al.

(Continued)

FOREIGN PATENT DOCUMENTS

| EP | 0 910 000 A1 | 4/1999 |
| EP | 1 134 636 A1 | 9/2001 |

OTHER PUBLICATIONS

Peter Zwinge, "Objektorientiertes Programmieren und Visualisieren von Automatisierungssystemen", ATP Automatisierungstechnische Praxis—ATP Oldenbourg Verlag, vol. 33, No. 9, Sep. 1991, Munchen, Germany, pp. 485-490.

(Continued)

*Primary Examiner*—Crystal J. Barnes

(57) ABSTRACT

The invention relates to a system and a method for modelling and executing business processes in MES systems (manufacturing execution systems) or manufacturing control systems by means of a plurality of independently operating processes which are modelled by automatic state or execution machines and interconnected asynchronous connections. Said processes can be independently distributed to a plurality of computers (deployment) and communicate with each other in an asynchronous manner. The modelling of said automatic execution machines is carried out by means of activity and data flow diagrams according to UML representation. An advantage of the inventive system or method is that said processes can be immediately executed and tested. External software systems can be integrated by means of wrappers or adapters.

21 Claims, 5 Drawing Sheets

U.S. PATENT DOCUMENTS

| | | | |
|---|---|---|---|
| 5,862,381 A | | 1/1999 | Advani et al. |
| 6,023,575 A | * | 2/2000 | Yokota et al. .................. 703/2 |
| 6,078,320 A | * | 6/2000 | Dove et al. .................. 715/866 |
| 6,557,116 B1 | * | 4/2003 | Matt et al. ..................... 712/28 |
| 6,563,503 B1 | * | 5/2003 | Comair et al. ............. 345/473 |
| 6,732,114 B1 | * | 5/2004 | Aamodt et al. ............. 707/102 |
| 6,795,089 B2 | * | 9/2004 | Rajarajan et al. ........... 345/629 |
| 6,823,220 B2 | * | 11/2004 | Mathew et al. ............... 700/31 |
| 6,823,299 B1 | * | 11/2004 | Contreras et al. ............ 703/14 |
| 6,829,630 B1 | * | 12/2004 | Pajak et al. .................. 709/201 |
| 6,944,848 B2 | * | 9/2005 | Hartman et al. ............ 717/124 |
| 6,973,638 B1 | * | 12/2005 | Gangopadhyay et al. ... 717/104 |
| 2002/0083413 A1 | * | 6/2002 | Kodosky et al. |
| 2002/0144256 A1 | | 10/2002 | Budhiraja et al. |
| 2003/0056199 A1 | * | 3/2003 | Li et al. ....................... 717/127 |
| 2003/0140126 A1 | * | 7/2003 | Budhiraja et al. .......... 709/220 |
| 2003/0172371 A1 | * | 9/2003 | Offenmuller ................ 717/120 |
| 2004/0015861 A1 | * | 1/2004 | Nagalkar |
| 2004/0017400 A1 | * | 1/2004 | Ly et al. ...................... 345/810 |
| 2005/0021348 A1 | * | 1/2005 | Chan et al. ...................... 705/1 |
| 2006/0101346 A1 | * | 5/2006 | Denzlein ..................... 715/762 |
| 2006/0149488 A1 | * | 7/2006 | Amtmann et al. ............ 702/85 |
| 2006/0212327 A1 | * | 9/2006 | Norman ........................... 705/8 |
| 2006/0259243 A1 | * | 11/2006 | Bregulla et al. .............. 702/19 |

OTHER PUBLICATIONS

Dirk Kozian, "Transparenz Ober die Abläufe schaffen", Elecktronik fur die Automatisierung 11, Nov. 17, 1999, pp. 66, 68-69.

Robin Milner, "Communicating and Mobile Systems: The π-calculus", Press Syndicate of Univers. of Cambridge, 1999, pp. 1-2.

Mike May, "The Creative Destruction of EAI", eAl Journal, Oct. 2001, Fuegotech, Plano, Texas, USA, pp. 56-58.

Joe Firmage, "Visual AppBuilder Architectural Overview", Novell Developer Notes, May/Jun. 1994, Provo, Utah, USA, pp. 1-12.

* cited by examiner

SYSTEM AND METHOD FOR MODELING AND/OR EXECUTING SOFTWARE APPLICATIONS, ESPECIALLY MES APPLICATIONS

CROSS REFERENCE TO RELATED APPLICATIONS

This application is the US National Stage of International Application No. PCT/DE02/04378, filed Nov. 28, 2002 and claims the benefit thereof. The International Application claims the benefits of German application No. 10161114.5 filed Dec. 12, 2001, both of the applications are incorporated by reference herein in their entirety.

FIELD OF INVENTION

The invention relates to a system for modeling and/or realization of software applications, especially MES applications, with at least one processor unit and with at least one display device.

Furthermore the invention relates to a method relating to this system, a computer program, a data medium and a data processing device.

BACKGROUND OF INVENTION

It is known from "Software für die Automatisierung—Transparenz über The Abläufe schaffen (software for automation—creating transparency across execution sequences", an article by Dirk Kozian in Elektronik für die Automatisierung 11, 1T._C1.1999 that what are known as Manufacturing Execution Systems (MES) can be used for automation of production or manufacturing execution sequences. These systems integrate the automation level (controls) with the ERP (ERP: Enterprise Resource Planning) systems of the enterprise control level. Manufacturing Execution Systems are systems which for example provide information for optimization of production execution sequences. On the one hand the Manufacturing Execution Systems must supplement the outline planning data of the ERP systems with system-specific and current detailed planning data and forward this accordingly to the subordinate automation level, on the other hand they have the task of transferring production-relevant information from the automation level, editing the data and passing it on to the enterprise control level. MES systems thus fulfill the task of a vertical integration between the enterprise control level and the automation level. Typical individual tasks of MES systems are Enterprise Asset Management, Maintenance Management, Information Management, Scheduling, Dispatching and Trace & Track. These tasks are executed by MES components or MES applications.

The use of asynchronously cooperating state machines for modeling communication systems is known from "Communicating and Mobile Systems: the n-Calculus", Robin Milner, Cambridge University Press, 1999.

An editor for creating process plans is known from EP 1 134 636. Here process plans are formed with the aid of rules by linking process targets. Process plans formed are checked and depending on the checking a release message can be activated.

SUMMARY OF INVENTION

The object of the present invention is to make available a system and a method for project planning of solutions for tasks in the MES area, in which asynchronous communication between individual software applications is made possible in a simple way.

In accordance with the invention the above object is achieved by the claims. In the MES environment in particular the applications or subcomponents mostly operate autonomously and (in their own right) synchronously alongside each other but communicate asynchronously with each other. The inventors thus used as their starting point the knowledge that MES applications and solutions for MES systems can be represented or realized very elegantly by asynchronously cooperating state machines, in which case the state machines are described or modeled by activity diagrams. The fact that the subunits communicate asynchronously with each other means that they can be modeled and realized independently of each other without formulating synchronism conditions. Subunits can for example be simple or even complex business processes (e.g. order processing, order monitoring etc.). The modeled state machines or automatic execution machines are also able to be run and tested immediately with their connections. This means that there is no "design break" in the development process. A user can perform the modeling of the connections between the automatic execution machines very elegantly and effectively. Either through the graphical connection of nodes in a flowchart via graphical input aids (e.g. mouse and Drag&Drop mechanism) or via project planning masks with which the communication elements of the activity diagrams are stored. The invention thus offers an integrated editing and runtime system. Users can plan their project solutions and do not have to write expensive programs. This increases the efficiency of the user (especially a system integrator or developer).

In addition the system in accordance with the invention makes possible the modeling and localization of business processes usual in MES systems (e.g. order processing etc.) in independent software subunits which it was previously only possible to implement as a fixed sequential program.

A first advantageous embodiment of the present invention for a system lies in the realization of the interconnections in a framework program with communication means. Using a framework program and employing standardized interfaces such as OPC (OLE for Process Control), ActiveX, XML (eXtensible Markup Language) or protocols such as SOAP (Simple Object Access Protocol) makes interoperability between subunits (e.g. MES applications) very simple and effective. A user can abstract from the underlying communication means when interconnecting the elements. Independence from the underlying communication means, e.g. HTTP (Hyper Text Transfer Protocol, COM, (Component Object Model), DCOM (Distributed Component Object Model), MSMQ (Microsoft Message Queue) means that users do not have to bother with implementation details when planning their projects.

A further advantageous embodiment of the present invention for a system lies in the fact that the activity diagrams include status logic and/or control logic and/or subroutines and resources for asynchronous communication. This increases the user's capabilities as regards their description and modeling options. A user can for example refine his models step-by-step using the subroutine techniques. In addition a user can define inquiries and or checkpoints or synchronization points in the flowchart.

A further advantageous embodiment of the present invention for a system lies in the fact that the state machines can be distributed to one or more processors. This allows a user to explicitly undertake a "deployment", i.e. he can affect the way in which the load or location of the state machines is distributed.

A further advantageous embodiment of the present invention for a system lies in the fact that other systems are able to be linked in using wrappers and/or adapters. Adapter and wrapper technologies are mechanisms known from information technology for integrating software components into a system. A wrapper maps the API (Application Programmable Interface) of a third-party component (e.g. an MES application of a third-party supplier) in the object model of the frame program. Thus a method of the API of the third-party component becomes a method of the framework program or an integer data type of the API of the third-party component becomes an integer data type of the framework program, etc. For COM (Component Object Model) objects the creation of a wrapper for a component to be integrated can be automated. A wrapper corresponds to a bridge. Wrappers are able to be implemented very quickly.

Adapters are one abstraction level higher than wrappers. The provided a uniform view of linked-in applications. An adapter offers functionality for starting, operating etc. the components to be linked in. An adapter corresponds to a "facade" in the language of design patterns.

The fact that the subunits communicate asynchronously with each other means that they can be modeled and realized independently of each other without formulating synchronism conditions. The modeled state machines or automatic execution machines are also able to be run and tested immediately with their interconnections. This means that there is no "design break" in the development process. A user can perform the modeling of the interconnections between the automatic execution machines very elegantly and effectively. Either through the graphical connection of nodes in a data flowchart via graphical input aids (e.g. mouse and Drag&Drop mechanism) or via project planning masks with which the communication elements of the activity diagrams are stored. The invention thus offers an integrated editing and runtime system. Users can plan their project solutions and do not have to write expensive programs. This increases the efficiency of the user (especially a system integrator or developer).

In addition the method in accordance with the invention makes possible the modeling and localization of business processes usual in MES systems (e.g. order processing etc.) in independent software subunits which it was only previously possible to implement as a fixed sequential program.

A first advantageous embodiment of the present invention for a method lies in the realization of the interconnections in a framework program with communication means. Using a framework and employing standardized interfaces such as OPC (OLE for Process Control), ActiveX, XML (eXtensible Markup Language) or protocols such as SOAP (Simple Object Access Protocol) makes interoperability between subunits (e.g. MES applications) very simple and effective. A user can abstract from the underlying communication means when interconnecting the elements. Independence from the underlying communication means, e.g. HTTP (Hyper Text Transfer Protocol, COM, (Component Object Model), DCOM (Distributed Component Object Model), MSMQ (Microsoft Message Queue) means that users do not have to bother with implementation details when planning their projects.

A further advantageous embodiment of the present invention for a method lies in the fact that the activity diagrams include status logic and/or control logic and/or subroutines and resources for asynchronous communication. This increases the user's capabilities as regards their description and modeling options. A user can for example refine his models step-by-step using the subroutine techniques. In addition a user can define inquiries and or checkpoints or synchronization points in the flowchart.

A further advantageous embodiment of the present invention for a method lies in the fact that the state machines can be distributed to one or more processors. This allows a user to explicitly undertake a "deployment", i.e. he can affect the way in which the load or location of the state machines is distributed.

A further advantageous embodiment of the present invention for a method lies in the fact that other systems are able to be linked in using wrappers and/or adapters. Adapter and wrapper technologies are mechanisms known from information technology for integrating software components into a system. A wrapper maps the API (Application Programmable Interface) of a third-party component (e.g. an MES application of a third-party supplier) in the object model of the frame program. Thus a method of the API of the third-party component becomes a method of the framework program or an integer data type of the API of the third-party component becomes an integer data type of the framework program, etc. For COM (Component Object Model) objects the creation of a wrapper for a component to be integrated can be automated. A wrapper corresponds to a bridge. Wrappers are able to be implemented very quickly.

Adapters are one abstraction level higher than wrappers. They provide a uniform view of linked applications. An adapter offers functionality for starting, operating etc. the components to be linked in. An adapter corresponds to a "facade" in the language of design patterns.

A further advantageous embodiment of the present invention lies in the fact that the method in accordance with the invention is implemented by a computer program. This enables any required modifications or adaptations to be easily made.

A further advantageous embodiment of the present invention lies in the fact that the computer program for the method in accordance with the invention is stored on a data medium This makes the method very easy to manage as regards logistics and distribution. Data media are typically normal computer program products such as diskettes or CDs.

A further advantageous embodiment of the present invention lies in the fact that the computer program for the method in accordance with the invention is installed on a data processing system. This increases performance.

BRIEF DESCRIPTION OF THE DRAWINGS

Further advantages and details of the invention can be found in the description of advantageous exemplary embodiments and in connection with the Figures. Where elements with the same functionalities are described in different figures these elements are identified by the same reference symbols. The diagrams show.

DETAILED DESCRIPTION OF INVENTION

Figure 1:
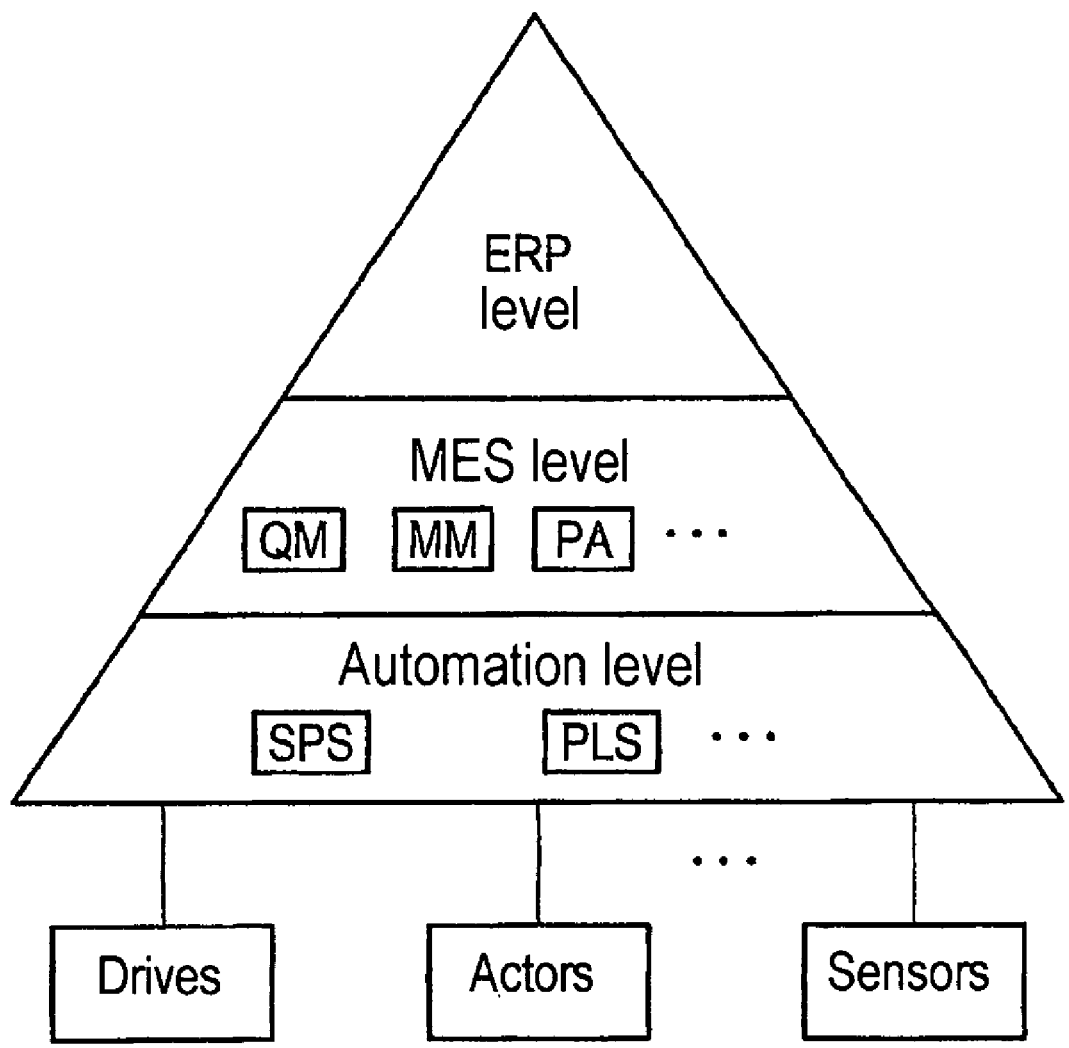
FIG. 1 in a basic overview diagram the "enterprise pyramid" with three control levels, FIG. 2 a typical overview diagram with software and hardware units for MES solutions, FIG. 3 an example of a state machine, FIG. 4 an example for cooperation of state machines, FIG. 5 The distribution of an MES application in independently executing subunits and FIG. 6 a project planning interface for activity diagrams.

The diagram shown in FIG. 1 is a basic overview diagram showing the three levels of control as are usually to be found in a producing or manufacturing enterprise. The pyramid form of the diagram expresses the fact that the information is compressed from the bottom up. The topmost level is the ERP (Enterprise Resource Planning) level. The business administration and sales tasks in an enterprise are normally performed at this enterprise resource planning level (e.g. finance, sales and marketing, human resources, reporting). Logistics tasks extending across different systems (e.g. order and materials management) are however also performed at this level. The SAP R/3 system is an ERP system which is very frequently used at the enterprise resource planning level.

The lowest level of the pyramid is the automation level (Controls). At this level programmable logic controls (PLC) are usually used in conjunction with visualization and process control systems (PLS). The drives, actors and sensors of the production and/or manufacturing devices are directly connected to the systems of this level.

The connecting element between the ERP level and the automation level is formed by the MES level. The applications of the MES level thus ensure that there is vertical integration between the ERP level and the automation level. On the one hand the MES applications must refine the outline planning of the ERP systems by production system-specific detailed planning and forward this to the systems of the automation level, on the other hand it is the task of the MES applications to accept production-relevant data of the automation level, edit it and forward it to the ERP level (enterprise resource planning level).

Typical MES applications include. Quality Management (QM), Maintenance Management (MM), Performance analysis (PA), Process Management, Labor Management, Asset Management. The three dots shown in FIG. 1 in each case express the fact that there can be further elements (applications, systems etc.) at a particular level.

MES systems or ERP systems as a rule contain what is known as a runtime system for scheduling the timing of the components involved (subcomponents, modules, tasks, operating system processes etc.), as well as what is known as an engineering system to create and edit programs intended for execution in the runtime system.

Figure 2:
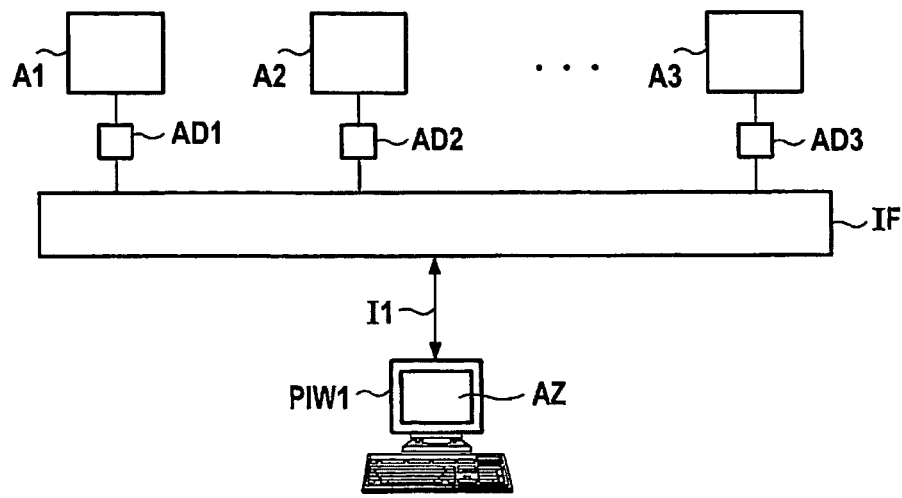

The diagram shown in FIG. 2 is of a typical overview with software and hardware units for MES solutions. The individual MES applications A1 to A3 are linked via adapters AD1 to AD3 to a framework program IF. A user workstation PIW1 is linked to the framework program IF via a bidirectional information path I1 and can thus manage and monitor the appended or integrated MES applications. The user workstation PIW1 usually consists of a display device (monitor, display, etc.), a data processing device (e.g. a PC) with processor and memory units as well as input units (keyboard, mouse, etc.). The MES applications A1 to A3 as well as the framework program IF can run on their own data processing units or processors but it is also possible for them to run on the data processing unit of the PIW1.

The relevant MES applications A1 to A3 are linked to the framework program IF via adapters AD1 to AD3. The connection between the adapters AD1-AD3 and the framework program IF is made by suitable data formats (e.g. XML), suitable protocols (XOP, OPC, etc.) and suitable transport mechanisms (e.g. DCOM or MSMQ). HTTP (Hyper Text Transfer Protocol) can also be used here. The SOAP (Simple Object Access Protocol) protocol based on the XML eXtensible Markup Language) can also be used for integration of the adapters AD1-AD3 into the framework program IF.

The adapters are thus the coupling elements between the framework program IF and the applications. The adapters can also be used to interconnect applications which are heterogeneous per se and integrating them with the framework program IF makes communication and data interchange between the applications possible. The adapters are software modules which establish the connections to different user programs or applications. In typical integration scenarios this involves integrations into systems from the MES, ERP, SCADA or controls world. An adapter provides functionality for starting, operating etc. a component to be linked in. An adapter allows access to data and functions of the user programs or applications to be linked in, makes specific runtime data available and allows engineering information to be loaded from the user programs or applications to be linked in. Adapters can be distinguished as regards their structure and their scope. Adapters can thus be permanently programmed for example or they can be configured or modeled. They can also differ in respect of the access options which they provide to the applications to be linked in, thus for example adapters can just allow data processing access but it is also possible for adapters to allow access to higher-ranking business processes. The adapters are loaded with the stored models and status information on startup. A check is then made at runtime as to whether and how the various integrated user programs or applications fit together. Visualization or monitoring components allow the status of an adapter to be interrogated and displayed at the user workstation PIW1 (including graphically). Adapters give the system and also the users a standardized and uniform view of applications (depending on the level of abstraction available at the adapters).

A further option of integrating software components is to use wrappers. A wrapper forms the API (Application Programmable Interface) of a third-party component (e.g. an MES application) in the object model of the framework program. Thus a method of the API of the third-party component becomes a method of the framework program or an integer data type of the API of the third-party component becomes an integer data type of the framework program As well as MES applications applications from the enterprise resource planning level and/or from the controls level can be integrated via the framework program IF and monitored or administered via the workstation PIW1 (the acronym PIW stands for Personalized Industrial Workplace). The framework program IF thus forms an integration platform for the entire industrial area. Various applications from the enterprise resource planning level, the MES level and the automation level can be easily and economically adapted using the framework program IF with the aid of adapters and/or wrappers. The framework program IF is thus to be viewed as a middleware platform and as a Manufacturing Application Integration tool. A user (e.g. a system operator) can use the workstation PIW1 to view the relevant statuses of the applications to be monitored, and can also access data and methods of the applications, and furthermore can use this access to connect applications to each other.

The framework program IF thus makes it possible on one hand to achieve a vertical integration of applications from various enterprise levels and on the other hand makes it possible for the framework program IF to perform a horizontal integration of applications of the MES level. Information interchange is implemented in the framework program IF between components using normal data formats (e.g. XML), normal protocols (XOP, OPC, etc.) and normal transport mechanisms (e.g. DCOM, HTTP or MSMQ).

The workstation PIW1 represents "One Window to the World" for a user on the front end side of MES applications or other applications from the enterprise. This means that the workstation provides a common uniform interface for integrational access to different, even heterogeneous applications in the enterprise. The user of workstation PIW1 can thus monitor and manage all integrated MES or other applications from this one workstation. This workstation can be connected to the applications via the Internet, the Intranet, LAN (Local Area Network) or other conceivable connections. It is also possible to embody this workstation as a mobile station, e.g. as a mobile terminal (PDA, mobile telephone). This mobility would provide further advantages to a user. The workstation PIW1 also includes input facilities one or more display devices AZ (e.g. display or monitor).

Figure 3:
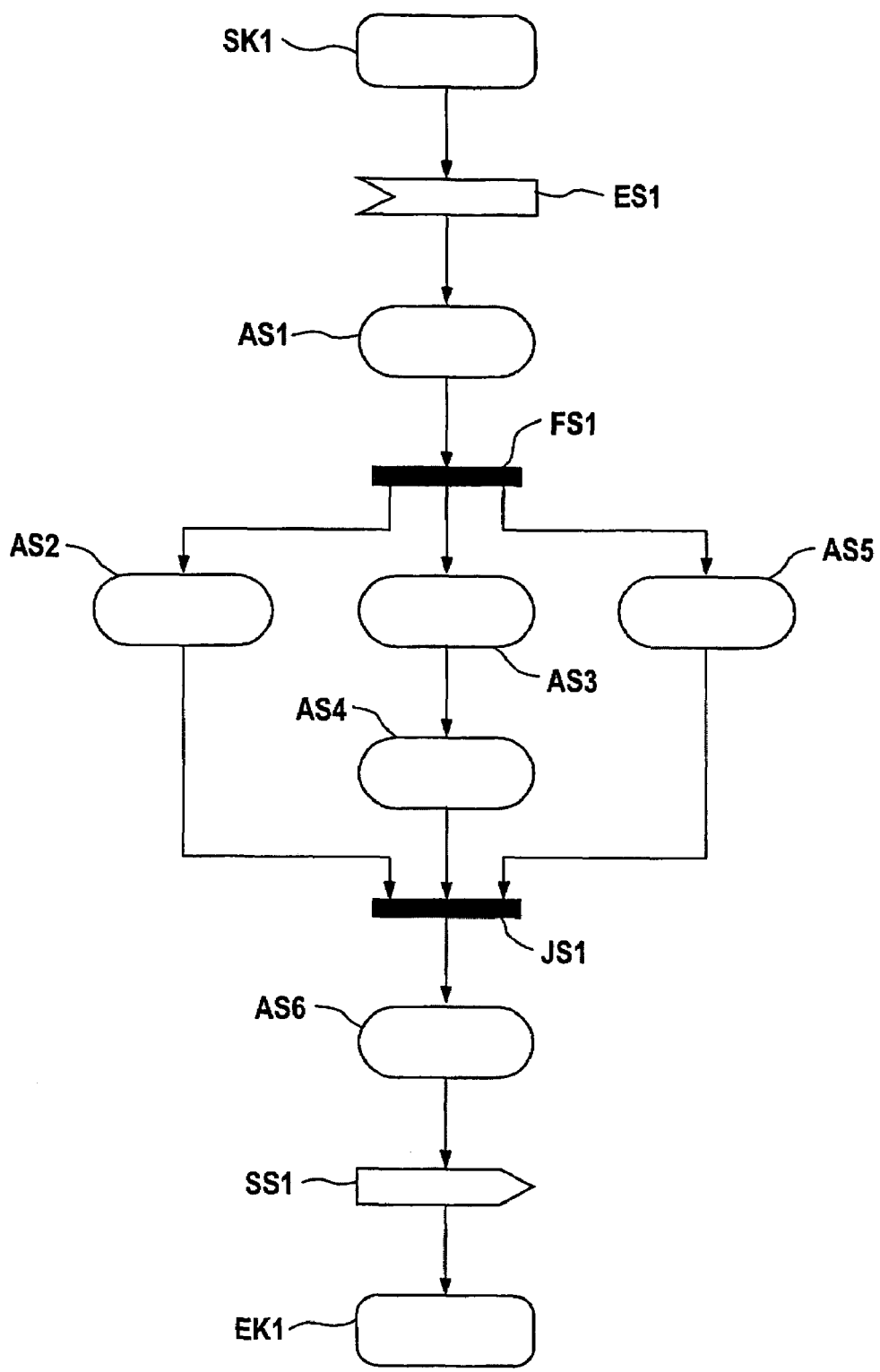
Figure 5:
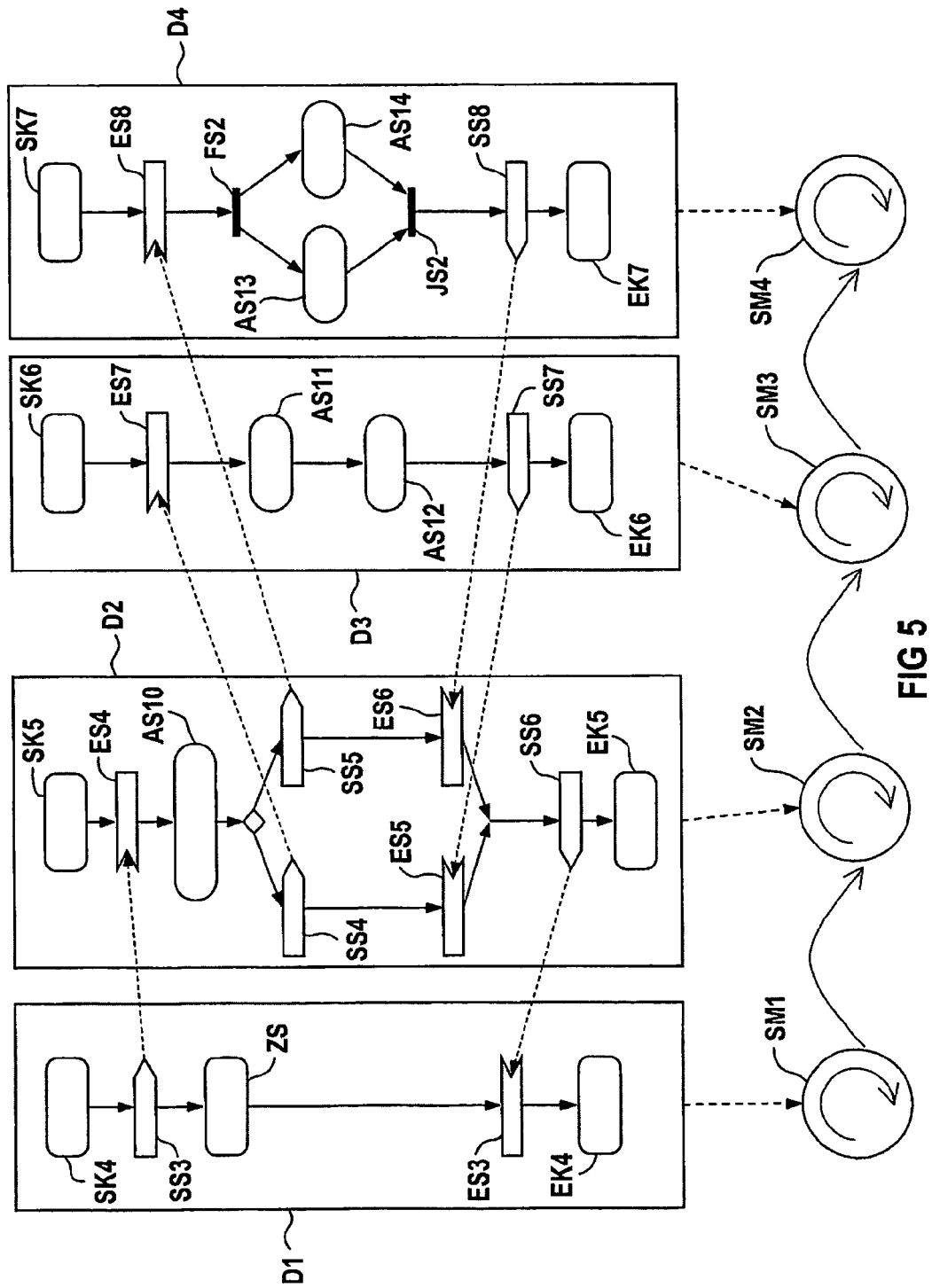

The diagram shown in FIG. 3 is an example of a state machine. State Machines (SM1-SM4; FIG. 5) are modeled by what are known as activity diagrams (D1-D4; FIG. 5) which describe the behavior of a state machine. An activity diagram describes a sequential sequence starting at start node SK1 and ending at end node EK1. The program execution itself is described in the verticals from the top downwards with the aid of symbols connected to each other by arrows. The program sequence itself follows from symbol to symbol along the arrows. In FIG. 3 the start node SK1 is followed by the receive symbol ES1. If there is a message present for a receive symbol ES1 the program execution sequence continues, otherwise the execution sequence waits until a message arrives for the receive symbol ES1. The receive symbol ES1 is followed by the activity symbol AS1 as the next symbol. If the program execution sequence encounters an activity symbol, activities which are stored behind the activity symbol are executed (e.g. calling a subroutine, method calls etc). In most cases scripts will be executed, e.g. VisualBasic scripts. The next symbol in the program execution sequence from FIG. 3 is fork symbol FS1, represented by a horizontal bar. For each fork symbol there is an associated joint symbol, also represented by a horizontal bar. In FIG. 3 this is the joint symbol JS1. A fork symbol spans parallel branches with parallel execution sequences which then wait for each other in the associated joint symbol. In the diagram shown in FIG. 3 the fork symbol FS1 covers three parallel branches. The left-hand branch only contains the activity symbol AS2, the right-hand branch only contains the activity symbol AS5 and the middle branch contains the two activity symbols AS3 and AS4. The activity symbols indicate that activities are to be executed. Once the activities of all three branches are ended, the program execution sequence continues with the symbol following the joint symbol JS1, in FIG. 3 the activity symbol AS6. After execution of the activity associated with the activity symbol AS6 the program execution sequence comes to the send symbol SS1. Send symbols are used to send control messages. After the message has been sent, represented by the send symbol SS1, the program execution sequence goes into the end node EK1 and ends. Activity diagrams can also be modeled as permanently executing processes.

Such activity diagrams describe processes which represent the behavior of subunits for software solutions, especially MES solutions. A solution for an MES system usually consists of very many such processes which are then described individually as activity diagrams but which communicate with one another synchronously by exchanging messages via send and receive symbols. This produces a loose coupling of such processes. This loose coupling allows the individual processes of an MES solution to be created separately and more or less independently of one another. The loose coupling also allows a very simple reuse of processes, subprocesses or an accumulation of processes for specific subtasks in an MES system.

Figure 4:
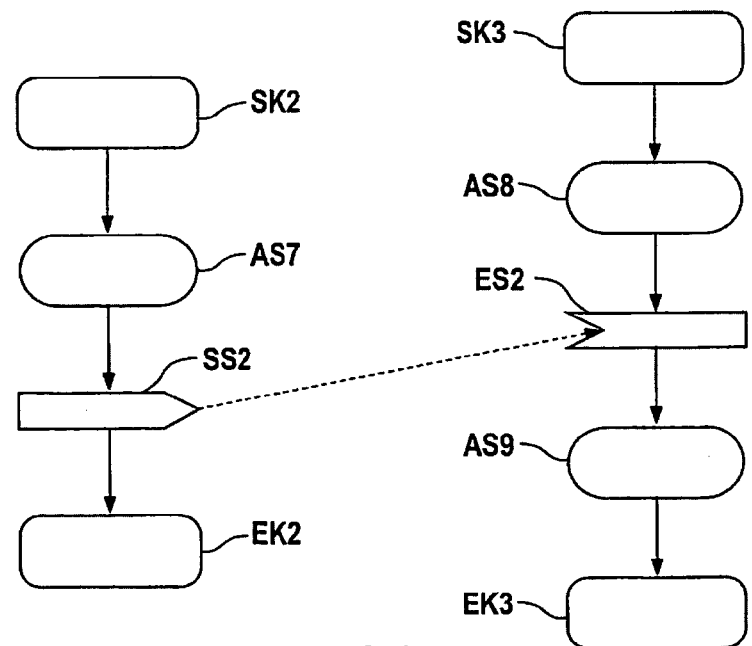

The diagram in FIG. 4 shows an example of cooperation between state machines (SM1-SM4; FIG. 5). The execution sequences of two state machines are shown in FIG. 4. The state machine in the left-hand part of FIG. 4 is represented by the activity diagrams (D1-D4; FIG. 5) with start node SK2, the activity symbol AS7, the send symbol SS2 and the end node EK2. The state machine on the right-hand side of FIG. 4 is represented by the activity diagram with the start node SK3, the activity symbol AS8, the receive symbol ES2, the activity symbol AS9 and the end node EK3. The dashed arrow from the send symbol SS2 of the left-hand activity diagram to the receive symbol ES2 of the right-hand activity diagram shows that the two state machines are loosely coupled to one another. In the right-hand activity diagrams the program execution sequence in receive symbol ES2 can only be continued if a message was sent to the receive symbol ES2 from the left-hand activity diagram by send symbol SS2. In receive symbol ES2 the continuation of the program execution sequence waits until this message arrives.

The diagram shown in FIG. 5 divides an MES system into four independently executing subunits (e.g. simple or complex business processes) which correspond in each case to state machines SM1 to SM4. The behavior of the state machines SM1-SM4 is described in each case by the activity diagrams D1-D4. In the diagram in FIG. 5 these state machines SM1 to SM4 are shown in a flowchart-like notation on the bottom edge of the diagram. Each of these state machines SM1 to SM4 corresponds to an MES application or MES component or MES subcomponent. The behavior of each of these subcomponents is described by activity diagrams D1-D4 which are shown above the flowcharts. The activity diagrams which describe the program execution sequence which is assigned to a state machine SM1-SM4 are shown in the rectangular boxes above the flowchart notation in each case. This assignment of the activity diagrams to the relevant state machine is represented by dashed lines from the relevant box to the relevant bubble (circle, node) which corresponds to a state machine.

The status symbol ZS is introduced as a new symbol in the left-hand activity diagram D1. This can be used to define wait states for example. In the next activity diagram D2, which is assigned to state machine SM2, an interrogation symbol is introduced as a further new symbol. This interrogation symbol is represented by a small diamond and follows activity symbol AS10 in the program execution sequence of state machine SM2. Depending on the result of an interrogation either the left-hand or the right-hand branch is executed. In the system or method in accordance with the invention an interrogation is linked to an interpreter which has a rule established for each branch and the branch for which the rule first occurs is the one executed. In the diagram in accordance with FIG. 5 the flowchart bubbles (circles, nodes) which each correspond to the state machines SM1 to SM4 are connected to each other by arrows. This shows that on the level of the data flowcharts (shown in a data flowchart-like notation) communication connections can be interconnected between the associated activity diagrams. A user can abstract from the realization of these interconnections. Regardless of which means of communication (e.g. MSMQ, HTTP or DCOM) are available, a corresponding connection is implemented in accordance with the interconnections If a user models activity diagrams D1-D4 and establishes asynchronous communication between the activity diagrams by interconnections, a corresponding runtime system is created in parallel. In this runtime system the processes and the interconnections are then immediately executable and testable. The diagrams can for example be tested in single steps or through recursive single steps. An integrated editing and runtime system is thus available. A user executing an engineering function thus creates an associated runtime system simultaneously.

If a user plans a project for example with an interconnection between two state machines SM1-SM4, then a connection for them is created implicitly, e.g. a Microsoft Message Queue or an HTTP connection. For the individual elements of the activity diagrams too associated implementation elements are automatically created for implementation when they are modeled. e.g. as processes and/or memory areas in the operating system.

Figure 6:
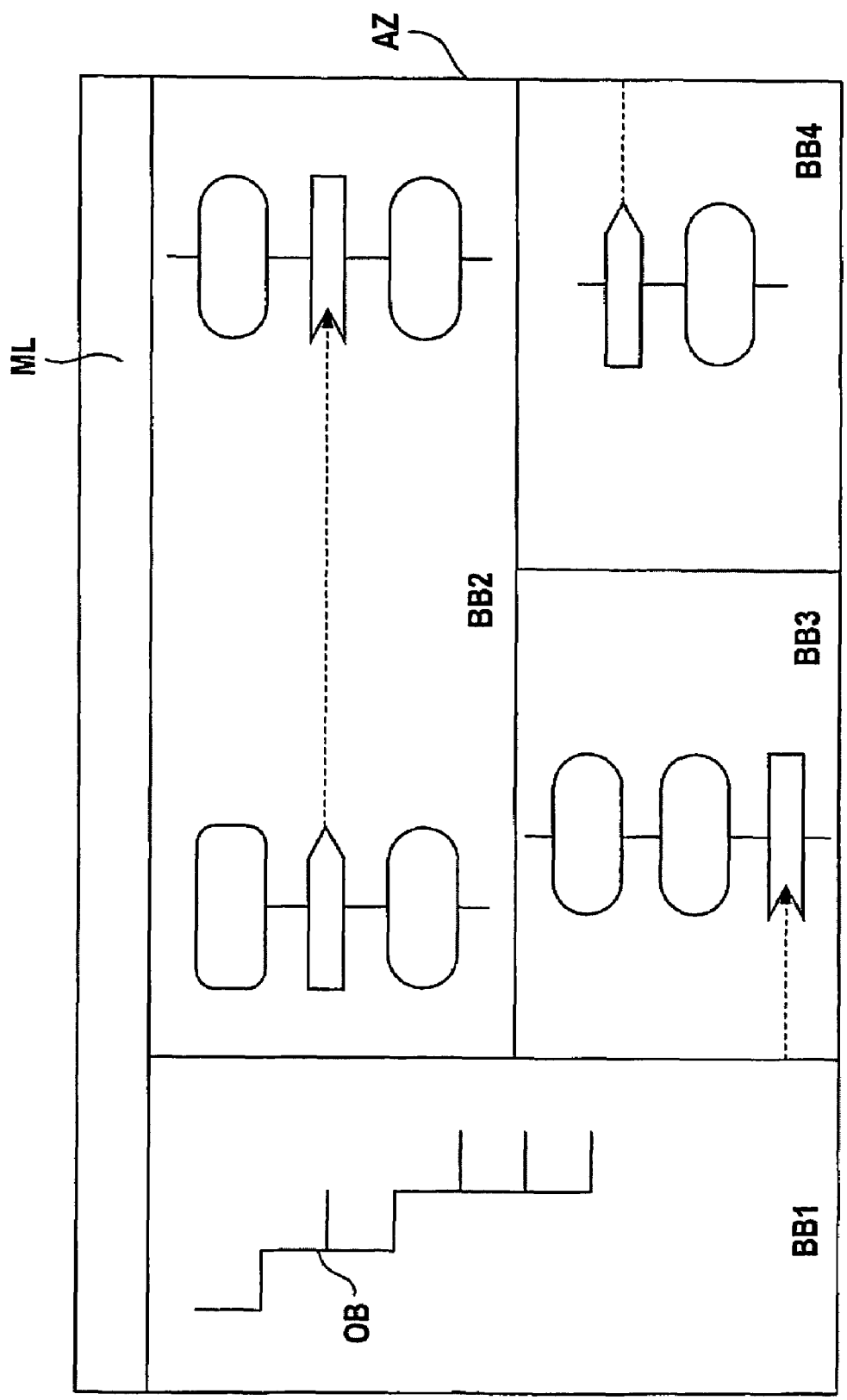

The diagram in accordance with FIG. 6 shows a project planning interface for activity diagrams. Different screen areas BB1 to BB4 are shown on a display device AZ (e.g. monitor or display). In addition a menu bar ML is shown on the top edge of the screen on which function buttons are stored which can be selected using a mouse or keyboard. The symbols of the activity diagrams can also be present in the menu bar ML and these can then be dragged to the corresponding screen areas with a drag&drop mechanism. One activity diagram or a number of diagrams can be shown in a screen area BB2 to BB4 respectively. Screen area BB1 stylistically shows an object tree OB in explorer-like notation which represents the underlying software system (e.g. a framework program). Drag&drop mechanisms can be used to connect elements of the object tree OB with activity diagrams. I.e. objects or elements of the object tree OB are stored with activity diagrams which represent an execution sequence. Interconnections between activity diagrams can be made using flowcharts, as shown in FIG. 5. A further option for interconnection is implemented using project planning masks which are assigned to the send and receive symbols of the activity diagrams. Through these project plannings the associated receive or send symbols are selected in the relevant diagrams by a user. Furthermore the project planning masks are used to define which control messages are exchanged and of what type (e.g. integer, real or even types defined by the users themselves) these control messages are. Connections can be however also be made at the object tree OB level. This is also done via drag&drop mechanisms.

A user thus has a powerful project planning environment. When creating a project plan, i.e. when modeling activity programs, a corresponding runtime system is automatically created for them in which the activity diagrams execute. The activity diagrams are also autonomous per se and can be created independently. They then run sequentially and synchronously but they communicate asynchronously.

This loose coupling allows MES systems especially to be very easily modeled and implemented.

In a subsequent deployment the activity diagrams or the state machines (SM1-SM4; FIG. 5) are distributed to processors on which they also physically run. It is possible for example for a server to contain more than just one activity diagram. A balanced load distribution is for example achieved by a suitable deployment.

A user is supported in a number of phases by the invention. He is first supported in the business process finding phase, i.e. when modeling his business process. A user is further supported in incorporating a business process found into an IT solution by the automatic creation of an associated runtime system. This is done automatically and without any design discontinuity. In a third phase a user can observe and control a defined business process. This system can thus be used for testing. Through suitable visualization, e.g. use of graphics and color, the system can also be stored with an animation.

To summarize, the invention relates to a system and a method for modeling and realization of business processes in MES (Manufacturing Execution Systems) or manufacturing control systems by a quantity of independently operating processes which are described by means of state or automatic execution machines and intermediate asynchronous connections. These processes can be distributed independently of each other over a number of processors (deployment) and they communicate with each other asynchronously. The automatic execution machines are modeled by activity diagrams and flowcharts in accordance with the UML presentation. One feature of the system or method in accordance with the invention is that this process can be executed and tested immediately. External software systems can be integrated via wrappers or adapters.

The system or method in accordance with the invention described above can be implemented as a computer program in the known languages. A computer program implemented in this way can also be stored and transported in the known way via electronic data paths, but also on data media (e.g. computer program products).

The invention claimed is:

1. A system for project planning of MES solutions, comprising:
    a processor unit and/or a display device;
    at least one activity diagram for sequential description of processes representing the behavior of subunits of software applications;
    a mechanism for interconnecting the activity diagrams for asynchronous communication between activity diagrams and/or between activity diagrams and their environment; and
    a runtime system which can be generated from the interconnections of the activity diagrams, wherein
    an activity diagram is represented by a state machine.

2. A system in accordance with claim 1, further comprising a display device.

3. A system in accordance with claim 1, wherein the interconneetions are realized in a framework using a communication mechanism.

4. A system in accordance with claim 1, wherein the mechanism for interconnecting the activity diagrams is a flowchart, and wherein a node of the flowchart corresponds to an activity diagram.

5. A system in accordance with claim 1, wherein the mechanism for interconnecting the activity diagrams is a mask from project planning of communication elements of the activity diagrams, wherein a communication element is project planned with the aid of a mask.

6. A system in accordance with claim 1, wherein the activity diagrams have status logic and/or control logic and/or subroutines.

7. A system in accordance with claim 1, wherein the state machines are distributed one or more processors.

8. A system in accordance with claim 1, wherein third-party systems are linked in by a wrapper and/or a adapter.

9. A method for project planning of MES solutions, comprising:
providing at least one processor unit and/or at least one display device;
describing the behavior of processes representing subunits of software applications by at least one activity diagram;
interconnecting the activity diagrams for asynchronous communication between the activity diagrams themselves and/or between activity diagrams and their environment; and
generating a runtime system from the interconnections of the activity diagrams, wherein an activity diagram is represented by a state machine.

10. A method in accordance with claim 9, wherein the behavior of processes representing subunits of software applications is described sequentially.

11. A method in accordance with claim 9, wherein the connections are realized in a framework with a communication mechanism.

12. A method in accordance with claim 9, wherein the activity diagrams are interconnected by a flowchart, and wherein case a node of the flowchart corresponds to an activity diagram.

13. A method in accordance with claim 9, wherein the mechanism for interconnecting the activity diagrams is a mask for project planning of communication elements of the activity diagrams, and wherein a communication element is project planned using a mask.

14. A method in accordance with claim 9, wherein an activity diagram comprises status logic and/or control logic and/or a mechanism for refinement.

15. A method in accordance with claim 9, wherein the state machines are divided up between one or more processors.

16. A method in accordance with claim 9, wherein third-party systems are integrated by a wrapper and/or an adapter.

17. A method in accordance with claim 9, wherein the method is implemented by a computer program.

18. A method in accordance with claim 17, wherein the computer program is stored on a data medium.

19. A data processing unit, comprising a computer program that implements a method for project planning of MES solutions, the method comprising:
describing the behavior of processes representing subunits of software applications by at least one activity diagram;
interconnecting the activity diagrams for asynchronous communication between the activity diagrams themselves and/or between activity diagrams and their environment; and
generating a runtime system from the interconnections of the activity diagrams, wherein an activity diagram is represented by a state machine.

20. A system for project planning of software solutions comprising:
a processor;
a display device connected to the processor;
a plurality of activity diagrams comprising a plurality of objects and elements represented by respective symbols on the display device;
a project planning mask associating respective send and receive symbols of the activity diagrams on the display device to define a runtime environment for asynchronous execution of the activity diagrams by the processor effective to implement a project plan.

21. A system for project planning of software solutions comprising:
a processor;
a display device connected to the processor;
a plurality of activity diagrams comprising a plurality of objects and elements represented by respective symbols on the display device;
a drag and drop mechanism for associating respective send and receive symbols of the activity diagrams on the display device to define a runtime environment for asynchronous execution of the activity diagrams by the processor effective to implement a project plan.

* * * * *